July 21, 1959 L. WESCH 2,896,089

VEHICULAR WARNING SYSTEM

Filed Jan. 29, 1957 2 Sheets-Sheet 1

LUDWIG WESCH
*INVENTOR.*

BY A. John Michel

ATTORNEY

LUDWIG WESCH
*INVENTOR.*

BY A. John Michel

ATTORNEY

United States Patent Office
2,896,089
Patented July 21, 1959

2,896,089

VEHICULAR WARNING SYSTEM

Ludwig Wesch, Heidelberg, Germany, assignor, by mesne assignments, to Eltro G.m.b.H. & Co., Gesellschaft für Strahlungstechnik, Bremen, Germany, a corporation of Germany Application January 29, 1957, Serial No. 636,914
Claims priority, application Germany February 2, 1956
5 Claims. (Cl. 250—215)

The present invention relates to a warning system for automotive and other vehicles or craft adapted to guard against collisions and to insure maximum safety under conditions of greatly restricted visibility, e.g. in dense fog or under blackout restrictions.

The use of infrared light rays to signal the approach of an obstacle or another vehicle has already been proposed. Such rays penetrate fog better than ordinary light; also, they remain invisible to hostile observers. Hitherto, the means for the detection of such rays included photoconductive devices such as photoelectric cells, photosensitive selenium elements and the like. These known devices, however, have a relatively poor signal-to-noise ratio so that their operation at greater distances or in very dense fog becomes rather uncertain.

The present invention has for one of its principal objects the provision of improved means for receiving infrared and other light rays for the purpose indicated above, adapted to afford greater safety by virtue of increased sensitivity.

Another object of this invention is to provide a compact, simple and inexpensive photosensitive receiving unit adapted to be readily installed in an automobile or some other vehicle, preferably along with a similarly compact transmitting unit designed to send out signals to warn other drivers or to be reflected by an approaching obstacle toward the associated receiving unit.

A receiver according to the invention comprises an oscillation generator including, as a frequency-determining element thereof, a capacitive circuit element having a photosensitive dielectric, hereinafter referred to as a photocondenser, the dielectric constant (and, therefore, the capacitance) of which varies with the intensity of incident illumination.

A photosensitive circuit element of this description draws virtually no direct current, in contradistinction to the photoconductive devices referred to above, and thus has a very reduced noise level. Moreover, its sensitivity can be readily increased to very high values by a physical enlargement of its condenser plates which are exposed to the incident radiation to be detected.

The photocondenser, which advantageously is shielded from undesired rays by an infrared filter having a sharp transparency peak near the low-frequency end of the visible spectrum, may form part of a sealed sub-unit positioned at an exposed location, e.g. at or near the headlights or the taillights of an automobile, and may be connected via a suitable high-frequency circuit (such as a shielded bifilar transmission line) to a controlled detector and indicator device in the body of the vehicle.

The device controlled by the photocondenser may be an oscillation generator operating in a transient oscillatory condition in which any change in the tuning of an associated resonant circuit results in a major variation of the D.-C. component of the output current, whereby a relay or other indicating means may be directly actuated in response to incident rays. It is, however, also possible to detect the detuning of an oscillator by means of a frequency discriminator whose output then controls the indicating means proper.

The above and other objects and features of the invention will be more clearly apparent from the following detailed description, given with reference to the accompanying drawing in which:

Fig. 1 schematically illustrates the operation of a system according to the invention installed aboard two vehicles passing along a highway;

An obstacle O, such as a sign post marking a turn in the highway H, reflects towards receiver RR1 of car A the infrared light emitted by this car's transmitter TR1. Receiver RR1, on being thus energized, causes the operation of an alarm device indicating to the driver the presence of obstacle O; if the receiver includes means for determining the intensity of the incoming rays, the driver may from this information ascertain the distance of the reflecting object, taking into account the prevailing atmospheric conditions and the presumable nature of the object. Thus, posts similar to the one shown at O, equipped with suitable reflectors of standardized design, may be positioned along the highway as a guide for vehicles utilizing the present system.

In similar manner the operator of vehicle B may obtain an indication of the presence of vehicle A ahead of him, by virtue of infrared rays from transmitter TR1' reflected back toward receiver RR1'. In order to provide a more positive warning, however, it is preferred to equip each vehicle with means for energizing its rear transmitter in response to light rays striking the rear receiver. Thus, as the infrared rays emitted by transmitter TR1' of vehicle B impinge upon receiver RR2 of car A, the latter's transmitter TR2 is actuated to direct a beam of infrared light toward receiver RR1'; in this manner the driver of the second vehicle is apprised of the presence of the car ahead even at a distance at which, under prevailing weather conditions, the directly reflected beam energy might have been insufficient to operate his indicator. At the same time the receiver RR2 may operate a device to inform the operator of vehicle A that another car is following at close distance and may be preparing to pass.

Figure 1:
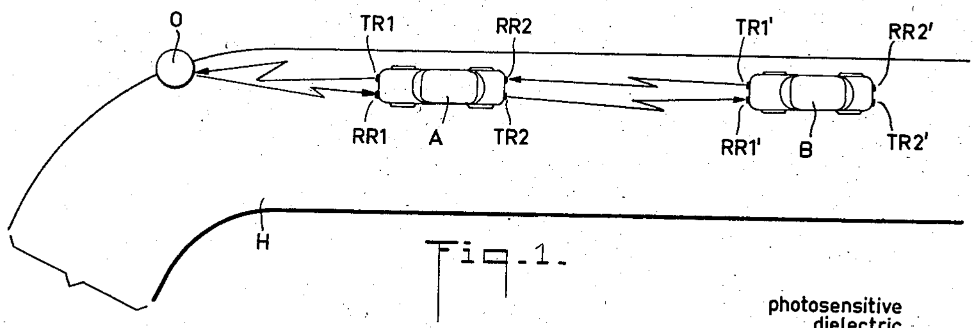
Fig. 1 shows two vehicles A, B traveling in the same direction along a highway H. Vehicle A is equipped with a front transmitter TR1, a front receiver RR1, a rear transmitter TR2 and a rear receiver RR2; vehicle B similarly has front and rear transmitters TR1', TR2' and front and rear receivers RR1', RR2'.
Figure 2:
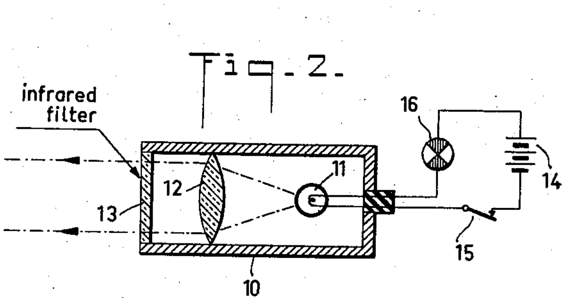
Figs. 2 and 3 show, respectively, a transmitter and a receiver for infrared rays according to the invention.

A suitable form of transmitter, to be used for any of the four transmitters shown in Fig. 1, has been illustrated at TR in Fig. 2. It comprises an opaque housing 10 containing a source of light 11, a collective lens 12 for forming the light for this source into a beam, and an infrared filter 13 ahead of this lens. Light source 11 is energized from a suitable power source, such as a battery 14, via a manual switch 15 and an automatic interrupter 16 modulating the transmitted beam in a predetermined manner. The purpose of interrupter 16 is to distinguish incident luminous energy produced by other sources, such as street lights, from the beam transmitted by a system according to the invention; thus the beam could be pulsed, for example, at a rate of about two cycles per second. It is also possible, by means of the interrupter 16 or its equivalent, to modulate the beam in a manner characteristic of the type of vehicle whence it originates, e.g. in order to distinguish between trucks, buses, passenger cars and emergency vehicles, and/or indicative of the highway lane or the direction in which the same is traveling.

Figure 3:
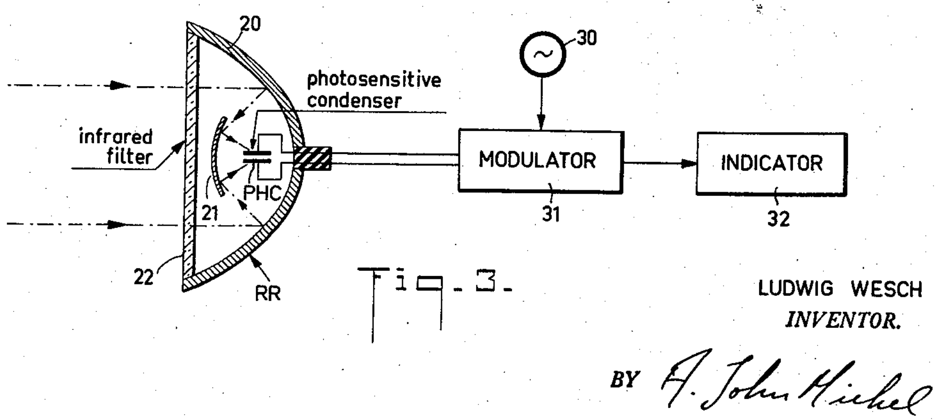

Fig. 3 shows a receiver RR adapted to be used as any of the four receivers of Fig. 1. It comprises a paraboloidal reflector housing 20, a paraboloidal mirror 21 within this housing, and a photosensitive element represented by photocondenser PHC; housing 20 is closed at the beam-entrance end by an infrared filter 22 so that substantially only light rays of wavelengths greater than those of the visible spectrum can reach the condenser PHC after reflection at the inner housing wall and at mirror 21. Condenser PHC is connected in a receiving circuit schematically shown in Fig. 3 to comprise an oscillator 30, a modulator 31 connected to vary the output of this oscillator under control of the condenser, and an indicator 32 adapted to be actuated by the modulator.

It will be understood that a lens-type optical focusing system as shown in Fig. 2 may also be used in a receiver and that, conversely, a reflector-type system of the character illustrated in Fig. 3 may likewise be utilized in a transmitter. Since, in any event, the lens 12 and the reflectors 20, 21 need not meet very high optical requirements, they may be manufactured by simple and inexpensive mass-production methods.

Figure 4:
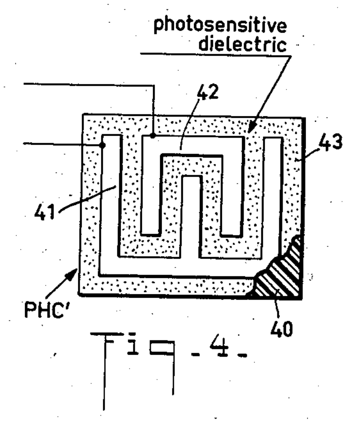
Figs. 4 and 5 show, in elevation and in cross-section respectively, two forms of photocondenser adapted to be used in a system according to the invention.

A more specific embodiment of a photocondenser, such as the element PHC in Fig. 3, is shown at PHC′ in Fig. 4. It comprises a supporting plate 40 of non-conductive material carrying interleaved conductive strips 41, 42 which serve as the two condenser plates. A dielectric powder 43 of photosensitive character, suspended in a highly insulating varnish, forms a coating on the support 40 which fills the space between the strips 41, 42 and may also extend over these strips themselves. The thickness of the layer 43 should be limited so as to insure ready penetration by infrared rays impinging perpendicularly upon the support 40. Suitable photosensitive materials to be used as the powder 43 are crystalline sulfides, selenides or tellurides of zinc, cadmium or mercury (or mixtures thereof) activated with copper, silver, gold, aluminum, indium, gallium or with an alkali or ammonium halide. The compounds CdSe and CdTe have been found very satisfactory, especially when used in combination to form a crystalline mixture containing not less than about 20%, by weight, of each compound. The activator may comprise, per gram of crystalline mixture, from $1.5\times10^{-3}$ to $1\times10^{-6}$ grams of copper, from $5\times10^{-3}$ to $5\times10^{-7}$ grams of gallium and from 10 to 200 milligrams of a mixture of $NH_4Cl$ and NaCl in equal parts. Example: 800 mg. of CdSe crystals, 200 mg. of CdTe crystals, 0.2 mg. of Cu, 0.01 mg. of Ga, 50 mg. of $NH_4Cl$ and NaCl mixture.

Figure 5:
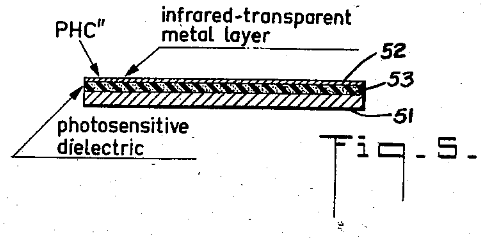

The condenser PHC″ of Fig. 5 comprises a lower metal plate 51, an upper metal plate 52 transparent to infrared radiation, and a dielectric layer 53 therebetween of the same character as the layer 43 in Fig. 4. The layer 53 may have a thickness of 0.1 mm. In contradistinction to the condenser PHC′ of Fig. 4, condenser PHC″ is struck by the infrared rays in a direction parallel to the electric field between the condenser plates.

Figure 6:
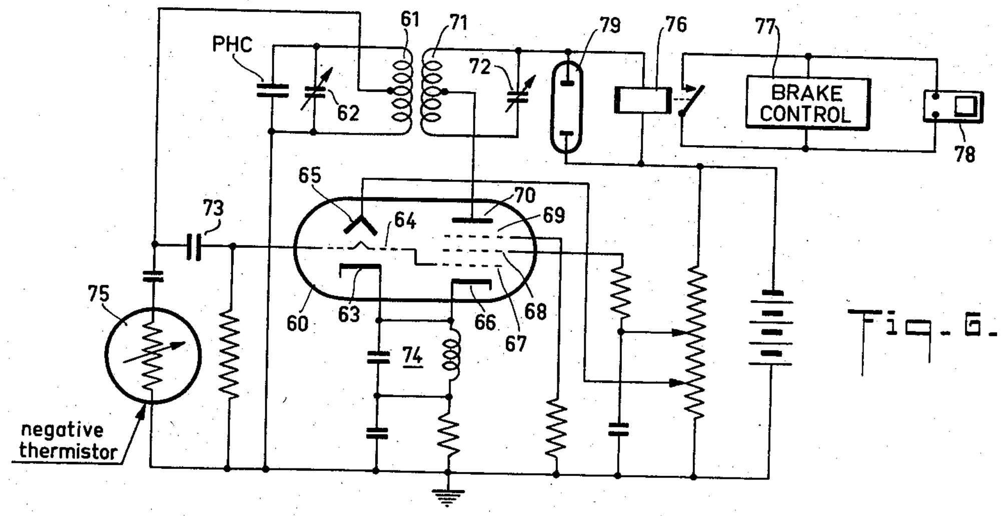
Fig. 6 is a circuit diagram of a receiving unit embodying the invention.
Figure 7:
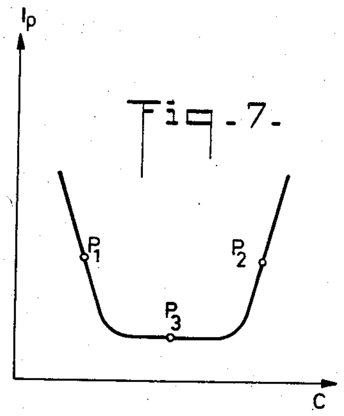
Fig. 7 is a graph illustrating the mode of operation of the system of Fig. 6.

In Fig. 6 the condenser PHC, which may be of the character described above, has been shown connected in the grid circuit of a vacuum tube 60 combining the functions of the oscillator 30 and the modulator 31 indicated schematically in Fig. 3. Condenser PHC forms part of a parallel-resonant circuit including an inductance coil 61 and a trimmer condenser 62 bridged across condenser PHC. Tube 60 comprises a left-hand triode section, including a cathode 63, a grid 64 and a "magic-eye"-type plate 65, and a right-hand pentode section, including a cathode 66 connected directly to cathode 63, a control grid 67 connected directly to grid 64, a screen grid 68, a suppressor grid 69 and a plate 70. The plate 70 is connected to the midpoint of an inductance coil 71 forming part of a parallel-resonant circuit including a tuning condenser 72. Coil 61, which has its midpoint connected to grids 64, 67 via a coupling condenser 73, is inductively coupled to coil 71 to provide negative feedback which tends to drive the grids 63, 67 progressively more negative in response to increasing amplitudes of oscillations in the coupled circuits PHC, 61, 62 and 71, 72. This has been illustrated in Fig. 7 which plots the plate current $I_p$ of the pentode section of tube 60 against the capacitance C of the capacitive branch PHC, 62 of the tuned grid circuit of the tube. As there shown, this current follows a curve which is approximately symmetrical around a point $P_3$ where the value of capacitance C is such that the two coupled circuits are tuned to the same frequency, the plate current being at a minimum at and around this point. At outlying values of C there exist transient conditions where the buildup or the decay of oscillations results in a progressive reduction or a progressive increase in plate current. For purposes of the invention it is desirable so to adjust the condensers 62, 72 as to stabilize the oscillation generator 60 in one of these transient conditions, thus at either point $P_1$ or point $P_2$, whereby a slight detuning of the grid circuit due to a change in the capacitance of condenser PCH will result in a sharp change in the tube output current. Such stabilization may be effected by the inclusion of an anti-resonant circuit 74 in the cathode lead of tube 60 and by the provision of a negative thermistor 75, shunted across the lower half of coil 61, which effectively grounds the midpoint of this coil for high-frequency currents in response to sustained oscillations of large amplitude occurring in the neighborhood of points $P_3$ in Fig. 7; the time constant of the thermistor should be large in comparison to the rate of pulsation of the infrared beam.

Thus, if it be assumed that the tube 60 is stabilized to have its operating point at $P_2$, then any increase in the capacitance C due to irradiation of photocondenser PHC will further detune the grid circuit of the tube and result in the flow of a larger plate current $I_p$ which will operate a relay 76 connected between the plate 70 and positive battery. Relay 76 is shown, by way of illustration, to actuate a brake-control mechanism 77 and a buzzer 78. A lamp 79, in the form of an elongated glow tube, is connected in parallel with relay 76 to indicate by its luminosity the extent of the departure of the plate current $I_p$ from its normal value $P_2$ and, thereby, the intensity of the radiation received. This intensity may also be determined by the observation of the luminous area of plate 65 of the "magic eye" triode section of tube 60.

It will readily be understood that the brake-control mechanism 77 shown in Fig. 6 will be provided only in the case of a front receiver, such as the receivers RR1 and RR1′ in Fig. 1, and that in the case of a rear receiver (RR2, RR2′) the contacts of relay 76 may be utilized to operate the associated rear transmitter (TR2, TR2′) in the manner previously described, as by closing the contact 15 (Fig. 2) thereof. In the case of a rear receiver, furthermore, the operation of buzzer 78 (in the rhythm of the signal emitted by the following vehicle) will warn the driver that another car may be requesting clearance to pass.

Figure 8:
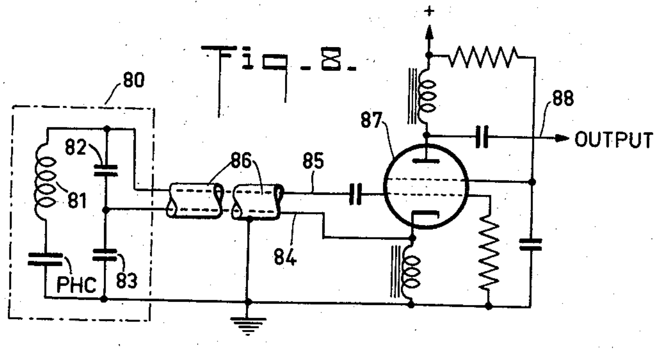
Fig. 8 is a circuit diagram of a modified form of receiving unit according to the invention.

Fig. 8 shows the photocondenser PHC as part of a tuned circuit surrounded by a casing 80 to constitute a self-contained assembly or sub-unit remote from the oscillator proper. Condenser PHC lies in the inductive branch of the tuned circuit, in series with a coil 81, whose capacitive branch comprises two condensers 82, 83 in series with each other. The junction between condensers 82, 83 and the upper terminal of condenser 82 are connected via conductors 84 and 85 of a shielded cable 86 to the cathode and the control grid, respectively, of a tetrode 87, the lower terminal of condenser 83 being grounded. Apart from the presence of the transmission line 84, 85, 86 and the photocondenser PHC, the tube 87 and the tuned circuit within casing 80 together constitute a conventional Clapp oscillator. The output of this oscillator, recovered at 88, will vary in frequency in accordance with changes in the dielectric constant of condenser PHC and may be utilized to operate any of the various alarm devices described hereinabove, e.g. after detection in a circuit of the type shown in Fig. 9.

Figure 9:
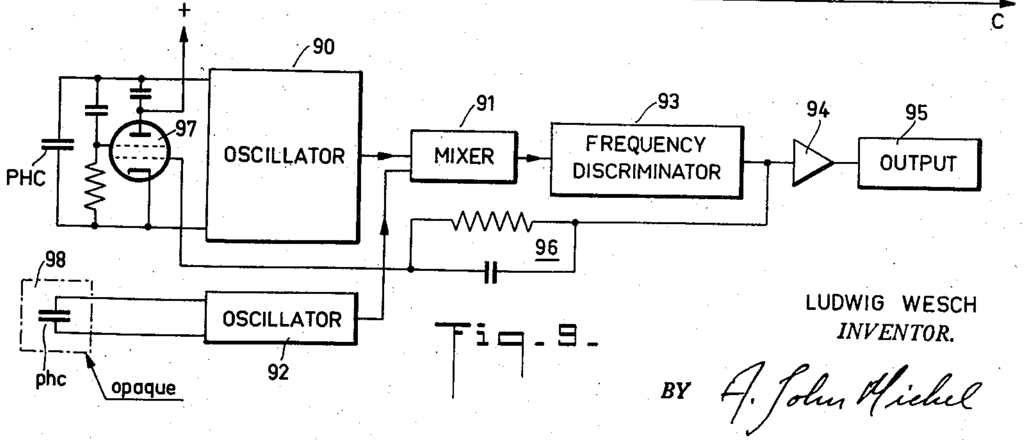
Fig. 9 is a block diagram of still another form of receiving circuit in accordance with this invention.

In the arrangement of Fig. 9 the photocondenser PHC controls, desirably but not necessarily in the manner described in connection with Fig. 8, the frequency of an oscillator 90 whose output is applied to a mixer 91 along with that of a conventional oscillator 92. Mixer 91 produces a difference frequency which is converted into a variable voltage by a frequency discriminator 93. Through an amplifier 94 the discriminator 93 controls an output circuit 95 which may include a recording device, a visual or an audible alarm device, a relay or any other form of indicator, e.g. as shown in Fig. 6. The output voltage of discriminator 93 is also applied, via a time-constant or RC circuit 96, to the control grid of a reactance tube 97, e.g. of the capacitive type, shown connected in parallel with the frequency-determining element PHC of oscillator 90. Circuit 96 should have a time constant greater than the pulsing rate of the modulated infrared beam, the arrangement being such that relatively slow changes in the capacitance of photocondenser PHC will be substantially compensated by the reactance tube 97 without the occurrence of an alarm.

Because the photocondenser PHC may have an appreciable thermal coefficient of capacitance, a second, similar condenser PHC may be provided in the control circuit of oscillator 92, this latter condenser being shielded from all incident radiation by an opaque enclosure 98. As a result of the compensating effect of condenser PHC, the difference frequency produced by mixer 91 will remain substantially unaffected by thermal fluctuations. If this difference frequency is in the audio range, it can also be made directly audible in the output circuit 95.

Whereas in the systems of Figs. 6 and 8 the generalized elements 30 and 31 of Fig. 3 have been combined in a single circuit element (60 and 87), it will be seen that in Fig. 9 the oscillator 92 corresponds to oscillator 30, oscillator 90 and mixer 91 correspond to modulator 31 and circuits 93, 94, 95 represent indicator 32.

The invention is, of course, not limited to the specific embodiments described and illustrated but may be realized in various modifications and adaptations without departing from the spirit and scope of the appended claims. In these claims the term "vehicle" is not intended to be restricted to surface transportation but may include ships, airplanes, missiles and any other type of craft.

What is claimed is:

1. In a vehicular warning system, in combination, a source of electrical oscillations comprising an amplifier element having a tuned input circuit and a tuned output circuit inductively coupled together, circuit means for controlling said oscillations, said circuit means including a capacitive element connected in one of said tuned circuits and provided with a photosensitive dielectric, said amplifier element being provided with frequency-determining means adapted to stabilize said amplifier element in a normal operating condition in which a change in the relative tuning of said coupled circuits produces a substantial output-current variation in said amplifier element, and alarm means controlled by the output of said source.

2. The combination according to claim 1, wherein the coupling between said tuned circuits is arranged to produce a negative feedback.

3. The combination according to claim 1, wherein said amplifier element is a vacuum tube, said alarm means including a "magic-eye"-type indicator tube, said vacuum tube and said indicator tube being provided with a common envelope.

4. In a vehicular warning system, in combination, a source of electrical oscillations comprising first and second oscillator means and mixer means for deriving a beat frequency from the outputs of both of said oscillator means, circuit means for controlling said oscillations, said circuit means including a capacitive element provided with a photosensitive dielectric and having an appreciable thermal coefficient of capacitance, said first oscillator means being provided with a control circuit including said capacitive element, said second oscillator means being independent of said capacitive element, a thermally sensitive impedance element connected to control said second oscillator means in a manner substantially compensating for thermal variations of said capacitive element, and alarm means connected by the output of said source.

5. The combination according to claim 4, wherein said impedance element comprises another capacitive element with a photosensitive dielectric and shield means for protecting said other capacitive element against incident light.

References Cited in the file of this patent

UNITED STATES PATENTS

| | | |
|---|---|---|
| 1,791,938 | Schroeter et al. | Feb. 10, 1931 |
| 1,983,882 | Rosenfeld | Dec. 11, 1934 |
| 2,355,607 | Shepherd | Aug. 15, 1944 |
| 2,568,435 | Downey | Sept. 18, 1951 |
| 2,582,728 | Walker | Jan. 15, 1952 |
| 2,741,725 | Thomas | Apr. 10, 1956 |
| 2,751,030 | Null | June 19, 1956 |
| 2,771,594 | Gourdou | Nov. 20, 1956 |

FOREIGN PATENTS

| | | |
|---|---|---|
| 1,020,878 | France | Nov. 26, 1952 |